US011257136B2

(12) United States Patent
LeBlanc, Jr. et al.

(10) Patent No.: US 11,257,136 B2
(45) Date of Patent: Feb. 22, 2022

(54) SYSTEMS AND METHOD FOR AUTOMATED PURCHASE AND RECEIPT OF CONSUMER MOTOR FUELS FOR PERIODS IN THE FUTURE

(71) Applicant: Gasmart, LLC, New Orleans, LA (US)

(72) Inventors: Joseph H. LeBlanc, Jr., Metairie, LA (US); Nick DiCosola, Batavia, IL (US); Sagy P. Mintz, Austin, TX (US); Leo E. Murphy, LaGrange, IL (US); Robert A. Miller, New Orleans, LA (US); William K. Ward, New Orleans, LA (US); William F. Kerins, New Orleans, LA (US); Luis R. Luque, Katy, TX (US); Parker P. Drew, Harrison, NY (US)

(73) Assignee: Gasmart, LLC, New Orleans, LA (US)

( * ) Notice: Subject to any disclaimer, the term of this patent is extended or adjusted under 35 U.S.C. 154(b) by 123 days.

(21) Appl. No.: 16/057,424

(22) Filed: Aug. 7, 2018

(65) Prior Publication Data
US 2020/0051145 A1    Feb. 13, 2020

(51) Int. Cl.
*G06Q 30/00*    (2012.01)
*G06Q 30/06*    (2012.01)
*G06Q 20/28*    (2012.01)

(52) U.S. Cl.
CPC ......... *G06Q 30/0601* (2013.01); *G06Q 20/28* (2013.01)

(58) Field of Classification Search
CPC .......................... G06Q 30/0601; G06Q 20/28
See application file for complete search history.

(56) References Cited

U.S. PATENT DOCUMENTS

| 2010/0306078 | A1* | 12/2010 | Hwang | G06Q 30/02 |
| | | | | 705/26.1 |
| 2014/0244413 | A1* | 8/2014 | Senior | G06Q 30/06 |
| | | | | 705/20 |
| 2018/0096326 | A1* | 4/2018 | Szeto | G06Q 30/0201 |

OTHER PUBLICATIONS

Kasprzak, Mary A. Forecasting jet fuel prices using artificial neural networks. Diss. Monterey, California. Naval Postgraduate School, 1995.*

* cited by examiner

*Primary Examiner* — Kathleen Palavecino
(74) *Attorney, Agent, or Firm* — Jones Walker LLP

(57) ABSTRACT

A computerized system for transacting the purchase and sale of consumer motor fuels between motor fuel merchants and retail consumers through software on a mobile or desktop connected device for periods in the future through the simultaneous execution of multi-party, multi-layered contingent transactions and pricing algorithms to ensure that all inter-related motor fuel merchant transactions are simultaneously transacted upon a retail consumer purchase execution. Motor fuels include refined products such as gasoline and diesel fuel, renewable fuels (e.g. ethanol, biodiesel), natural gas (including liquefied natural gas), jet fuel and electricity.

25 Claims, 11 Drawing Sheets

SYSTEMS AND METHOD FOR AUTOMATED PURCHASE AND RECEIPT OF CONSUMER MOTOR FUELS FOR PERIODS IN THE FUTURE

BACKGROUND

The present invention relates to a forward contract for the delivery and receipt of consumer motor fuels at a specified price during a specified period in the future between a retail consumer and a series of inter-related motor fuel merchants using a computerized method of facilitating the retail motor fuel merchant and any motor fuel merchant inter-dependencies, related contingent pricing algorithms, and associated transportation, margin, tax and pricing strategy considerations. In this manner, the computerized method provides retail consumers of motor fuels with an offer to purchase the consumer's future motor fuel requirements (grade and quantity) from a selection of participating retail motor fuel merchants at each merchant's specified price for each type of motor fuel for one or more specified periods in the future using a software and data structure design that facilitates any inter-related contingent merchant inter-dependencies and pricing algorithms to ensure that all inter-related motor fuel merchant transactions are simultaneously transacted upon a retail consumer purchase execution.

The current features of consumer motor fuels can best be described as necessity and immediacy:
1. Necessity: Motor fuels are essential for consumers to power vehicle engines needed in their daily commuting, business operations and daily necessities. Necessity implies that consumers will purchase motor fuels with limited regard to the price of such motor fuels.
2. Immediacy: Consumer motor fuels are currently only available to consumers when they have capacity to take immediate delivery (i.e., their fuel tank is capable of storing additional fuel) at the then current price, which is commonly referred to in commodity trading as a "Spot Market" (i.e., purchases for immediate or near immediate consumption). Consumers have a very limited ability to safely store motor fuels for future use and have limited to no ability to purchase any desired motor fuel quantities based upon a price today that represents a delivery date in the future.

There are numerous types of motor fuels available in the U.S. and internationally, including, but not limited to, gasoline, diesel, natural gas, renewable energy, jet fuel, and electricity. Gasoline is the primary motor fuel consumed in the US comprising approximately 36% of U.S. energy consumption. According to the U.S. Energy Information Administration ("EIA"), over 400 million gallons of finished motor gasoline were consumed daily in 2017. According to the National Association of Convenience Stores ("NACS"), the average household consumes 729 gallons of gasoline annually with 78% of those purchases made using credit or debit cards. Natural Gas is commonly considered a "dependable and clean transportation fuel" by the Institute for Energy Research and makes up 29% of the U.S. energy consumption. When either compressed or liquefied, natural gas has recently been used as a safe and reliable form of consumer motor fuel for vehicles capable of using a natural gas fuel source. In 2015, renewable energy comprised almost 10% of U.S. motor fuel consumption with the majority of today's automobiles capable of using motor fuels with 10% to 15% renewable components, primarily ethanol. Certain flexible fuel vehicles can run on 100% ethanol. In 2012, the U.S. consumed 30% of the world's jet fuel. An airline's largest operating cost is jet fuel and the expenses related to its procurement. Electric vehicles ("EVs") are also becoming increasingly popular. In 2016, 753,000 EVs were sold globally, up 40% from 2015. Today, over 2 million electric vehicles are in circulation, due to improved performance and expanding infrastructure.

Since gasoline represents the majority of motor fuel consumption (55% according to EIA during 2017), the history and structure of the gasoline market will be used to describe the problems addressed by the present invention. The method or process of buying and selling retail consumer motor fuel has remained virtually unchanged since the commercial production of motor vehicles in the late 1800's, whereby retail motor fuel merchants post a price on a sign for drivers to use as the primary and most often only mechanism for price discovery and, often legislated specifically to require such signs to be displayed "in such manner as to inform motor vehicle drivers of the price per gallon or liter in order to avoid the traffic congestion and hazards created by vehicles moving from one station to another in order to ascertain the price of motor vehicle fuels". Upon arrival at a motor fuel retail station, a retail consumer is currently only provided with the ability to purchase quantities for which they are able to take physical possession of at such time at the then currently posted price, thus defining the current retail gasoline market as a "spot convenience yield market" since the price of the motor fuel is only based upon immediate delivery and sold at a convenience premium since the consumer is only able to purchase the fuel when they are relatively low on fuel and need right then without many options to find alternative sources or prices since they may not have enough fuel to get to alternative outlets at that time. As such, retail motor fuel consumers are exposed to extreme uncertainty, price volatility, and limited control of a basic transportation necessity without any tools or methods to allow retail customers to take control of their future motor fuel requirements.

The refined product merchants, which include those that manufacture (refine, blend, process) raw materials (crude oil, ethanol) into various combinations of motor fuels (and other chemicals and products), the transportation merchants (truck, pipeline, marine, rail companies), the terminal and storage companies, and the retail gas stations each separately and collectively buy and sell the vast majority of all motor fuels consumed based upon spot market pricing conventions. Accordingly, since such merchants typically acquire their respective inventories of motor fuels at spot prices in advance of any sale to their respective customers, any subsequent changes in the spot market pricing subjects such merchants to the volatility in the value of their inventory of motor fuels on hand. As such, refined product merchants must charge consumers a higher price to compensate for the unpredictable and uncontrollable spot market price volatility and losses that often occur. This is currently the primary, and in many cases the only, mechanism available to refined product merchants to offset any such losses.

The motor fuel trading system and markets, as they exist today, are the remnants of an archaic system. When a consumer (which can include a small business or municipality) wishes to purchase motor fuel, they must drive their vehicle to a retail station and purchase only what their vehicle can store at the prices offered on the sign posted by the merchant. If the consumer wants to lock in such prices for their future transportation fuel needs, they have no ability to transact such a purchase other than purchase a storage tank (which is often not allowed in residential areas) and purchasing the motor fuel at the then current spot price for storage in such a tank.

Today's energy markets are primarily benchmarked against exchange-traded crude oil futures prices. While there exist certain exchange-traded refined products markets, the liquidity and tenor of such refined product markets is significantly lower than the comparable crude oil markets. By comparison, crude oil is a raw material that has limited utility unless refined. Participants in the crude oil marketplace are large exploration and production companies, refineries, and speculators with minimal trade volume of one contract for a specific month equivalent to 1,000 barrels (or 42,000 gallons) for delivery in New York harbor, a volume far more than most consumers consume in a lifetime and not where most consumers would consider convenient. Consumers, who are the ultimate users of crude oil products, are not provided with the ability to participate in the energy markets for which they are the ultimate buyer.

As can be imagined, the network of refined product merchants is complex since product specifications vary by location, time of the year, and regulatory requirements. In addition, the location of the supply (the refineries) is not proximate to the consumer, requiring refined products to be transported and distributed through many parties, transportation mechanisms, and regulatory jurisdictions. Each merchant within the system has related costs, desired profit margins, taxes, and logistical challenges. Therefore, the method of developing a platform for consumers to purchase motor fuels at a specified period in the future requires a new relational process where the contracts between the various constituents provide an efficient, transparent, and effective mechanism for price, volume, payment, performance, and accountability. The present invention provides such a solution.

Consumers face a steep demand curve for gasoline. The EIA estimates that the Short-Term Elasticity Output ("STEO") is somewhere between −0.02 and −0.04. This supports the theory that gasoline is a necessity no matter the price. Furthermore, Utilimarc, a firm dedicated to helping fleet managers with solutions and analytics, states that gasoline costs are "a significant chunk of the municipal fleet budget." These two problems—spot market price volatility and the inability to accurately budget gasoline expenditures—drives the need to access the gasoline market beyond the spot market, and to do so in an efficient manner.

The present invention provides a solution, giving retail consumers and motor fuel merchants a mechanism and marketplace whereby large numbers of consumers can secure their future motor fuel requirements at known prices while providing the motor fuel merchants with the ability to dramatically expand the motor fuel marketplace liquidity. Expanding the number of participants in the marketplace enhances market efficiency and transparency and provides for the development of additional risk management tools to benefit both consumers and motor fuel merchants.

SUMMARY OF THE INVENTION

A system for selling motor fuel is disclosed, the system comprising a computerized network configured to facilitate motor fuel transactions amongst participating motor fuel merchants wherein the network is further configured to provide one or more offers to sell a motor fuel for pick up by a consumer at a specified pick up location during a specified period of time. The system also comprises an application for use by the consumer, wherein the application is configured: (a) to present the offers to the consumer, (b) to enable the consumer to select at least one of the offers, (c) to enable the consumer to purchase a quantity of the motor fuel from the selected offer, and (d) to validate the pickup of any portion of the purchased quantity of the motor fuel at the specified location during the specified period of time for the selected offer. The consumer application may comprise a web-based application or a smartphone application, and the consumer may access the application on a smartphone or other mobile device, or at a self-service terminal.

A method for purchasing a quantity of motor fuel for future pick up is also disclosed. The method comprises (a) receiving from a computerized network one or more offers to purchase a motor fuel for future pickup, wherein each offer comprises a price per quantity of the motor fuel, a specified pickup location, and a specified period of time for pickup; (b) selecting one of the offers; (c) selecting a quantity of the motor fuel to purchase for the selected offer; and (d) purchasing the selected quantity of motor fuel for the selected offer. Any portion of the purchased quantity of motor fuel may be picked up at the specified pick up location during the specified period of time for pickup. The specified location for each offer may comprise a specific retail merchant location, or may comprise a plurality of retail merchant locations. This method further comprises selecting a plurality of the offers, selecting a quantity of the motor fuel to purchase for each of the selected offers, and purchasing the selected quantities of motor fuel for each of the selected offers. The steps of this method are performed by the purchaser using an application, which can be, for example, a web-based application or a smartphone application. The purchaser accesses the application on a smartphone or other mobile device, or on a self-service terminal. The application further enables the purchaser to validate the pickup of any portion of the purchased quantity of motor fuel at the specified pickup location during the specified period of time for pickup. This validation may occur by the application providing a validation code to be entered at the specified pick up location, or by the application reading a device QR code at the specified pick up location, or by a device at the specified pick up location reading a digital authentication code generated by the application, or by any other means known in the art.

A method for selling a quantity of motor fuel for future pick up by a consumer is also disclosed. The method comprises (a) providing a consumer with one or more offers to purchase a motor fuel for future pick up, wherein each offer comprises a price per quantity of the motor fuel, a specified pick up location, and a specified period of time for pick up; and (b) selling to the consumer a quantity of the motor fuel for a selected offer. The steps of the method are performed by the seller using a computerized network.

For all of the disclosed embodiments, it is envisioned that the motor fuel may be selected from gasoline, diesel, methane, ethane, compressed natural gas, liquefied natural gas, hydrogen, electricity, jet fuel, propane, butane, liquefied petroleum gas, biofuels, or any other motor fuel that one or ordinary skill in the art would appreciate would benefit from the system of the present invention.

BRIEF DESCRIPTION OF THE DRAWINGS

The features and advantages of the present invention will be more clearly understood from the following description taken in conjunction with the accompanying drawings in which.

DETAILED DESCRIPTION

The present invention relates to a computerized multi-layered contingent series of electronically-facilitated contracts between motor fuel merchants to provide specific quantities and prices in an inter-dependent structure for a certain motor fuel product for delivery during a certain period. These motor fuel products, prices and quantities are ultimately offered to retail consumers to purchase using software on a mobile or desktop connected device. According to the present invention, consumers use one of several pre-determined forms of electronic payment to purchase from the retail merchant a quantity of a specific type of motor fuel at a specific price for pick up by the consumer during a specified period of time in the future. In this manner, the consumer is linked to the aforementioned electronically-facilitated contracts between motor fuel merchants. Payment to the inter-related motor fuel merchants will not occur until their respective performance and delivery in accordance with the applicable electronically-facilitated contract(s) have been satisfied. During the specified period of delivery for the volumes purchased by the consumer, the retail motor fuel merchant dispenses the purchased quantity to the customer without any additional payment required by the consumer, completing the retail consumer transaction. Each retail consumer transaction will generate a unique multi-layered thread of inter-dependent relationships that start with the retail consumer and terminate with an originating supplier (typically a refinery). The thread will contain detailed transaction terms, electronically-facilitated contract requirements, payment details, and performance tracking mechanisms to match, track, and ensure that the performance of each motor fuel merchant, at each layer of the inter-dependency, is satisfied.

As used herein, the following terms shall have the following meanings, consistent with the understanding of a person having ordinary skill in the art in view of the present disclosure:

Multi-party: Two or more parties involved in a transaction.

Multi-layered: The aggregation of a fragmented transaction network.

Contingent transactions: Two or more good faith bids or offers that are reliant upon other good faith bids or offers.

Thread: The unique alignment of consecutive, contingent, bi-lateral counterparties, products and locations within a transaction network.

Instrument: The unique motor fuel grade offered by a specific merchant at a specific and unique location available for pick up during a pre-defined and specific future period in time.

I. Introduction

Figure 1:
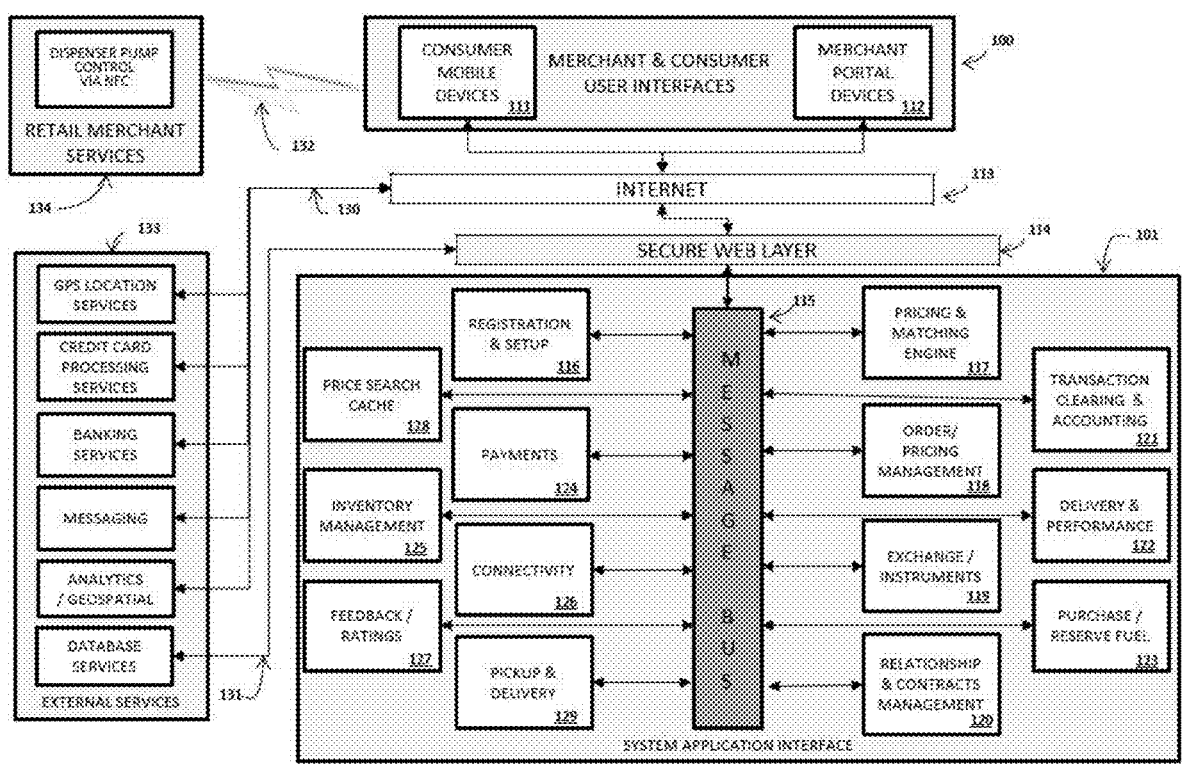
FIG. 1 depicts a block diagram illustrating an exemplary system of the present invention, for use in facilitating an exemplary computerized method of the present invention.

FIG. 1 is a block diagram illustrating a system for facilitating a computerized method of establishing forward contracts for the delivery and receipt of consumer motor fuels at specified prices during specified periods in the future between a retail consumer and a series of inter-related and inter-dependent motor fuel merchants, related contingent pricing algorithms and associated transportation, margin, tax and pricing strategy considerations. In a preferred embodiment of the present invention, motor fuel merchants and motor fuel retail consumers communicate with network-based system application interfaces 100, separately configured for the customized needs of the motor fuel merchants 111 and for the retail motor fuel consumers 112, each via an internet connection 113 and secure web layer communication protocol 114 which are separately customized and configured for the needs of the motor fuel merchant and retail motor fuel consumer electronic devices deployed. In the current embodiment, the system application interfaces 101 utilize application protocol interfaces (APIs) via message bus 115 and are provided as a series of microservices in order to provide client-server separation, effective and secure methods of updating network communication and software applications, and to facilitate customized electronically-enabled services for the specific application requirements of the respective motor fuel merchants and retail motor fuel consumers. The system application interface includes registration and setup modules 116 to facilitate merchant and consumer platform access, user account setup, payment method authorization and other initial registration requirements to use the present invention software appropriately. As shown in FIG. 1, the network-based system application interfaces 101 may include various modules or components such as, without limitation, a price matching engine 117, order & pricing management modules 118, forward contract exchange instrument management modules 119, relationship & contracts management modules 120, transaction clearing and accounting modules 121, delivery & performance modules 122, purchase/reservation modules 123, price search modules 128, payment modules 124, inventory management modules 125, connectivity and messaging modules 126, feedback/ratings modules 127, and pickup and delivery modules 129.

Also shown in FIG. 1, the system of the present invention may include access (via either firewalled network-based communication protocols 130 or Point-to-Point Virtual Private Network (VPN) 131) to certain external, commercially-available corollary services 133 including, but not limited to, GPS location services 135, credit card payment processing services 136, commercial banking services 137, network-based messaging services 138, analytics and geospatial services 139, and network-based database services 140. In addition, FIG. 1 depicts, according to an example embodiment, the interface between the retail consumer user interface 112 and a retail motor fuel merchant dispenser pump controller 134 utilizing secure pump manufacturer interfaces with mobile Near Field Communications (NFC) protocols 132 embedded within the consumer application and mobile device in order to facilitate the present invention to enable motor fuel disbursement during a retail motor fuel pick up request, which includes system application interfaces to, for example, the pickup & delivery modules 129, delivery & performance modules 122, purchase and reserve fuel modules 123, inventory modules 125, GPS location services 135 and connectivity modules 126.

Figure 2:
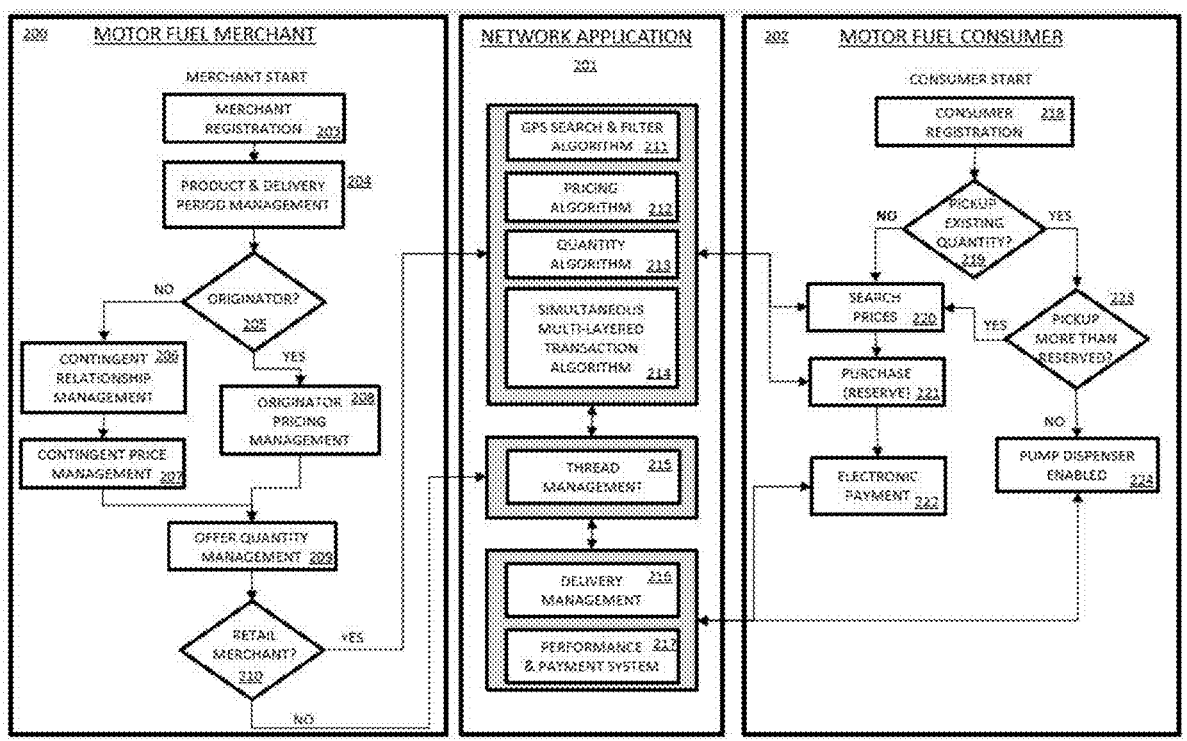
FIG. 2 depicts a flowchart illustrating the inter-relationship between motor fuel merchants and motor fuel consumers through a network application in accordance with one embodiment of the present invention.

FIG. 2, represents an exemplary flowchart depicting a preferred method of the present invention, and specifically the inter-relationship between motor fuel merchants and motor fuel consumers through a network application in accordance. The exemplary flowchart is divided into three sections: Motor Fuel Merchant section 200, Network Application section 201, and the Motor Fuel Consumer section 202. The Motor Fuel Merchant section flowchart demonstrates the process logic for participating motor fuel merchants to register with the system 203, setup motor fuel products in the system and establish the future delivery periods to be offered for such products offered for sale 204. In addition, the Motor Fuel Merchant section depicts the process logic for motor fuel merchants to either designate themselves as an originating merchant and originator price management 205 and 206, or for such merchants to establish electronically-facilitated relationships contracts and related contingent price management between other participating merchants registered in the system 206 and 207. The Motor Fuel Merchant section also depicts how Motor Fuel Merchants manage the quantities offered for sale by each merchant 209 and how retail motor fuel merchants are identified and exposed to the Network Application section that interacts with the Motor Fuel Consumer section 210. The exemplary flowchart of FIG. 2 highlights that only retail motor fuel merchants are directly transacting with retail motor fuel consumers and that such retail motor fuel consumers are not able to observe any of the contingent, multi-layered relationships or pricing structures or the non-retail motor fuel merchants participating.

FIG. 2 also depicts an exemplary embodiment of a Network Application section 201, showing the network-based system application interfaces that provide interactive processing logic for facilitating GPS search and filter algorithms 211 which facilitate retail motor fuel consumer search requests that are based upon a combination of retail motor fuel preferences, filters, location of the retail motor fuel consumer, and the locations of the retail motor fuel merchants. In addition, the Network Application section also includes the pricing algorithm module 212 that manages originating, contingent and retail price coordination throughout the network-based platform and data structures while facilitating immediate cascades of potential updates of items affecting contingent price dependencies. In addition, the Network Application section also includes the quantity algorithm module 213 which manages available quantities offered in a multi-layered contingent merchant relationship structure, whereby the volumes offered by contingent motor fuel merchants are electronically controlled by to ensure such volumes do not exceed the quantities offered by related merchants in the hierarchy of layers contained in a specific and collective thread dependency and that such orders are updated and controlled as transactions are purchased (reserved) accordingly. In addition, the Network Application section also includes a simultaneous, multi-layered transaction algorithm 214 that manages the transactional integrity required of complex thread structure of contingent merchant price and quantity relationships in a fast-moving commodity price environment that provides the Motor Fuel Consumer section 202 application the combination of an interim price and quantity freeze period during an exemplary motor fuel consumer purchase decision process, as well as, the transactional integrity processing logic to simultaneously record a multi-level thread transaction to all affected parties. In addition, a threads management module 215 contains the logic associated with applying the contracted relationships and maintaining individual thread integrity as defined by the platform and merchants. Also, the Network Application section also includes the delivery management module 216 that interacts with the motor fuel merchant performance and payment system 217 to ensure that any transaction delivery requirements are complied with prior to facilitating any payment for such quantities purchased by the motor fuel consumers.

FIG. 2, also depicts an exemplary embodiment of a Motor Fuel Consumer section 202, showing the process logic for how participating retail motor fuel consumers register with the system of the present invention 218. Once registered, the exemplary flowchart demonstrates the interactive decisions provided to retail motor fuel consumers to either search for new quantities to potentially purchase or pickup existing quantities that have already been purchased 219. If the retail motor fuel consumer chooses to search for new quantities and prices of a location-based selection of product preferences, future delivery period preferences, and other brand loyalty incentive features 220, then the retail motor fuel consumer is provided with options to purchase (reserve) such future period fuel choices and electronic payment and transaction processing is electronically-enabled 221. If the consumer chooses to pick up existing (already purchased) volumes, then the current embodiment of the present invention interacts with network-based dispenser pump interfaces to enable the dispenser pump to deliver the quantities of fuel selected by the retail motor fuel consumer for delivery at such a time 224. In one illustrative embodiment of the present invention, in the event that the consumer chooses to have the dispenser pump to be enabled to dispense more volumes than the quantity that had been previously purchased (reserved), then the system will interface with the search module to purchase (reserve) quantities of fuel available for immediate delivery at the currently offered spot price for such time period and enable the dispenser pump to dispense such additional quantities accordingly 223 and 220.

II. Motor Fuel Merchant Inter-Connectivity

Most motor fuel merchants, which includes refineries, terminals, pipelines, transportation companies, natural gas processing plants, electric utility companies and retail gas stations, have a primary economic interest in operating from a price neutral perspective, whereby such merchants are interested in achieving a range of margins on the operation of their business without regards to the actual motor fuel price or the implications of potential price volatility. The present invention uses a merchant relationship thread, or series of digital relationships that provide for a contingent, simultaneous spread structure that allows intermediary motor fuel merchants to offer future motor fuel sales on a contingent basis with virtually no commodity price risk or upfront capital obligations.

Figure 3:
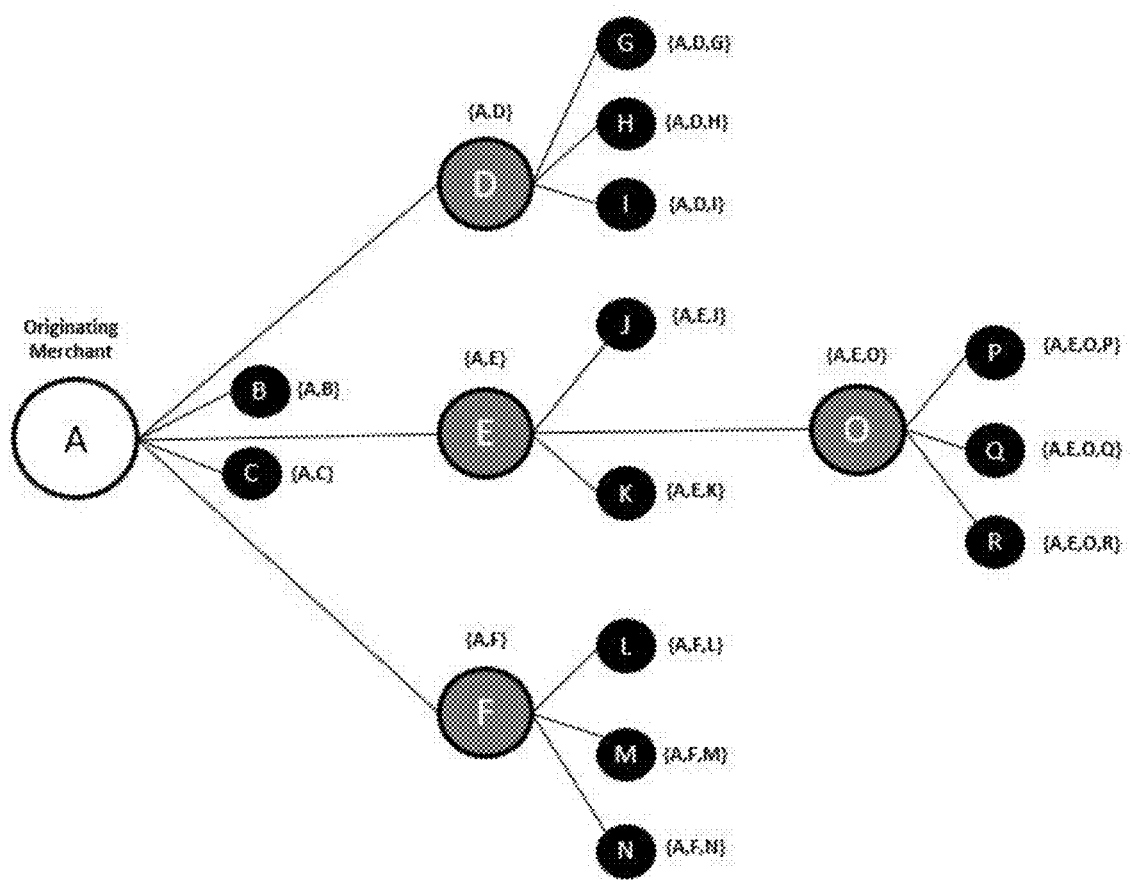
FIG. 3 depicts an exemplary transaction network of the present invention.

Using refined petroleum products as an example, FIG. 3 represents an illustrative embodiment of the present invention that reflects refined product merchant relationships that span up to 4 levels. FIG. 3 demonstrates the multi-layered network of inter-related supplier merchants creating a multiplicity of pricing relationships. Each layer is created when a merchant, using an electronically-enabled contract, agrees to sell to its respective customers a specified slate of motor fuel products at different future dates of delivery with prices and quantities that may be contingent upon another merchant's price and quantities for the same product and future delivery dates. In this manner, the network of the present invention constructs a unique electronically-generated "thread" that uniquely binds each series of consecutive, contingent, bi-lateral counterparties, each with their unique product and location, creating the electronically-enabled transaction network of the present invention. The network electronically-enables participating merchants with the ability to create motor fuel offers which are contingent on their participating supplier merchant's respective offers whereby such contingent relationships are electronically connected and uniquely traced back to the originating merchants. When a customer purchases a quantity of motor fuel offered by a retail motor fuel merchant for pickup during a specific period of time in the future, the present invention electronically triggers a simultaneous execution of all multi-layered, electronically recorded thread contingent purchases and sales based upon the interconnected network of offers.

Merchant A in the current exemplary network of FIG. 3 may represent a refined product merchant interested in offering a specific quantity of a certain type of refined product for future delivery at a specified price as a supplier to its various merchant customers. Merchant A is likely to represent a crude oil refinery that does not sell directly to retail consumers, but only sells to other merchants, such as terminals, distributors, or gas stations. Since Merchant A is not relying on the purchase of any refined products from any other merchant and is willing to offer future quantities at specified prices, Merchant A would be deemed in the embodiment of the present invention as an "Originating Merchant."

In the exemplary network of FIG. 3, Merchants B, C, D, E, and F are refined product merchants who are electronically-enabled to purchase refined products from Merchant A. Merchants B & C are retail merchants (gas stations that offer motor fuels to retail consumers) and Merchants D, E & F are wholesale merchants (terminals, distribution) that do not sell directly to retail consumers. However, Merchants B, C, D, E & F are only willing to offer to their respective customers the same products for the same future delivery periods that they could buy from Merchant A with the addition of profit margins, taxes (if applicable), and other adjustments added to the Merchant A price, but such merchants do not want to purchase any volumes from Merchant A unless their respective customers initiate a purchase first. As such, this creates a contingent relationship between Merchant A's offer to sell to Merchants B, C, D, E and F and the inter-related offers to sell by Merchants B, C, D, E and F. No quantities of any product are sold nor is there an obligation to purchase unless the customers of Merchants B, C, D, E or F were to agree to purchase a quantity offered at the adjusted prices of such merchants. In this manner, the network of the present invention creates an electronically-enabled thread of multi-layered contingent relationships whereby there is a clear and distinct, unique path backwards from any merchant back to the originating merchant offer. The present invention thus allows price or volume changes by the originating merchant to be instantaneously changed throughout the network of dependent contingent merchants without creating any adverse margin implications to such dependent refined product merchants. In this manner, the network of the present invention thus does not require any pre-purchase of inventories by contingent merchants in order to offer their respective customers with the ability to purchase motor fuels for future delivery.

Figure 4:
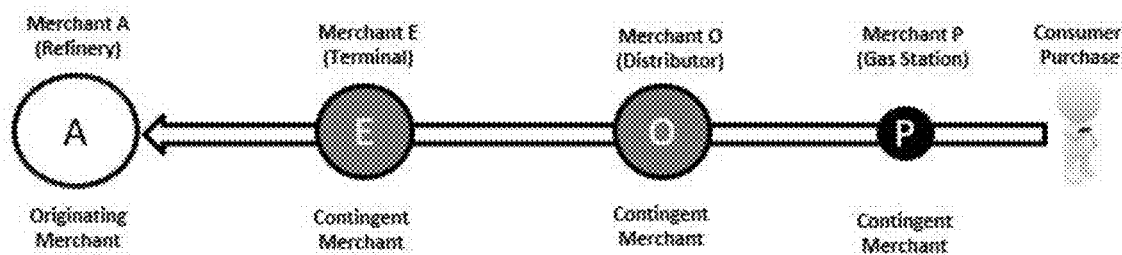
FIG. 4 depicts an exemplary contingent relationship (thread) of the present invention.

FIG. 4 depicts a unique thread example that highlights the multi-layered refined product merchant relationship and the retail motor fuel consumer purchase implications. In the exemplary thread of FIG. 4, the retail motor fuel consumer is offered a retail motor fuel price from Merchant P (Retailer or Gas Station) in which Merchant P's price for the future period of delivery is contingent upon Merchant O's quantity and price, which is contingent upon Merchant E's quantity and price, which is contingent upon Merchant A's quantity and price, whereby Merchant A is the Originating Merchant. The network of the present invention electronically facilitates the creation of a new layer for each contingent merchant in the merchant relationship thread and a contingent merchant pricing algorithm that includes a combination of the following, without limitation, for each of the motor fuel types and each future delivery period:

1. Contingent Cost—The offer price from the contingent supplier merchant that would represent the purchase price to the contingent merchant in this layer of the thread.

2. Profit Margin—The profit margin to be added to the aforementioned contingent cost in the formulation of a new, contingent offer price for the contingent merchant in this layer of the thread.

3. Additional costs (if applicable)—Any additional costs (transportation, additives, etc.) to be added to the aforementioned contingent cost and profit margin in the formulation of a new, contingent offer price for the contingent merchant in this layer of the thread.

4. Fees and taxes (if applicable)—Any fees and taxes to be added to the aforementioned contingent cost, profit margin and additional costs in the formulation of a new, contingent offer price for the contingent merchant in this layer of the thread.

In this manner, the present invention enables each contingent merchant to establish offer prices for each of their motor fuel products and each future delivery periods without specifying an outright, fixed, or specific price for each respective product and delivery period. Instead, the pricing algorithm incorporated into the present invention facilitates a price neutral contingent structure whereby each contingent merchant's respective cost and resulting offer price will change automatically with any change in pricing algorithm of any merchant in the multi-layered merchant supplier thread without impacting the margin or economic risk of the dependent, electronically-connected, contingent merchants in the thread. Accordingly, any change in a merchant's pricing algorithm components (profit margin, fees, additives, taxes) will impact that merchant's respective resulting offer price and automatically cascade through all interconnected contingent merchants electronically connected in the network of threads. Ultimately, the pricing algorithm of present invention facilitates the retail motor fuel merchant (in this example, the gas station) to offer the retail motor fuel consumer the opportunity to purchase, at a specific price and during a specific time period in the future, quantities that may be constructed from a series of multi-layered pricing formulas, whereby each quantity of product offered for each future delivery period will have a unique thread structure of merchants electronically facilitated by the network of the present invention, at prices that satisfy the cost and margin requirements of each merchant in the thread. In addition, the present invention utilizes a contingent offer quantity algorithm which electronically facilitates the ability of each merchant to vary the quantity of each motor fuel product and future period of delivery offered. This quantity algorithm electronically manages merchant limitations throughout each respective thread to ensure that contingent merchants are not able to offer a quantity that exceeds the contingent supplier quantity offered to each respective contingent merchant in the thread and that any retail motor fuel consumer purchases are appropriately electronically updated throughout the multi-layered thread networks impacted by any respective retail consumer purchases.

Throughout the electronically-facilitated multi-layered contingent network of threads of the present invention, good faith offers are posted by the participating merchants. Prior to a consumer purchase, no contingent merchant in a thread is obligated to pre-purchase any volumes offered, which is a sharp contrast to the current retail motor fuel marketplace where all products offered by retail motor fuel merchants are pre-purchased and inventoried in advance of any retail consumer purchase transactions. In a preferred embodiment of the present invention, a retail motor fuel consumer may search via an optional filter the universe of retail motor fuel merchants and motor fuel types offered, to allow the retail motor fuel consumer the option to select and purchase a quantity of motor fuel from a specific retail merchant (gas station or a network of gas stations as in the exemplary network of FIG. 3) at a specific price, whereby, upon selection and purchase, the network simultaneously executes and electronically records all multi-layered contingent transactional components in the specific thread network affected. The risk of any contingent participating merchant being exposed to adverse price risk is mitigated. Instead of a cascade of transactions, the network electronically utilizes a data structure and processing algorithm that facilitates the simultaneous multi-party reservation and subsequent transaction execution process ensuring that all transactional components of the merchant pricing and quantity algorithms used to generate the offer to the retail motor fuel consumer were executed at the respective multi-layered pricing and quantity specifics represented throughout the affected thread to the retail motor fuel consumer upon selection. For instance, using the example embodiment in FIG. 3, as a customer accepts the offer posted by Merchant P (Gas Station), all merchants within the network, Merchants A, E, O and P, would be electronically executed simultaneously.

FIG. 4 further illustrates the contingent nature of a single thread, including the pricing and quantity algorithms. In the illustrative embodiment of FIG. 4, Merchant P cannot offer more quantity for sale than the quantity offered by Merchant O. Merchant O cannot offer more quantity for sale than the volume offered by Merchant E, etc. In addition, if Merchant P has a retail motor fuel consumer agree to purchase at the price offered, then all contingent prices and quantities will be simultaneously filled in order to ensure that no participating merchant in the thread is exposed to an unfilled bi-lateral transaction segment of the multi-layered structure.

Figure 5:
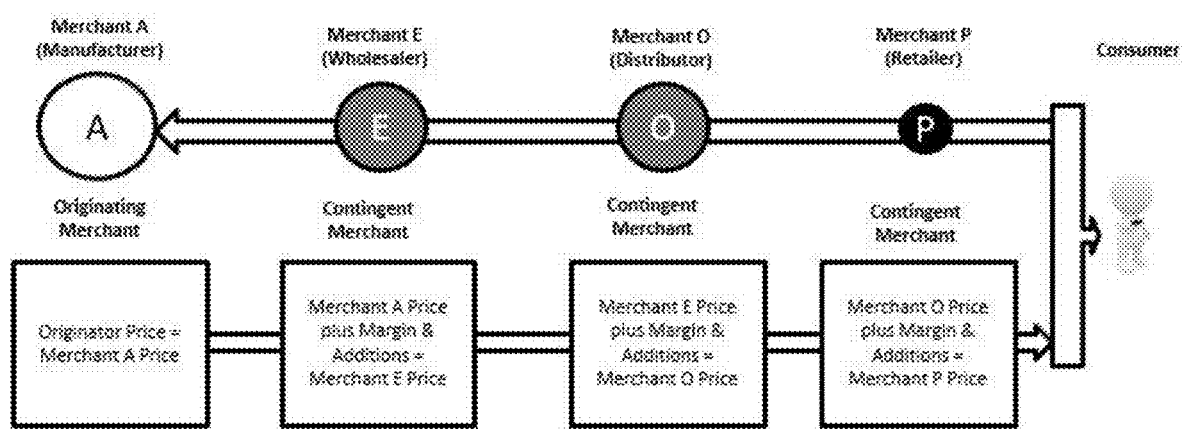
FIG. 5 further depicts the exemplary thread of FIG. 4.

FIG. 5 further illustrates the exemplary thread of FIG. 4, a simultaneous execution of all bi-lateral transactions within a network thread. The creation of the multi-layered contingent thread utilizes a series of good faith bi-lateral bids/offers between participating merchants. When a transaction is initiated by a retail motor fuel consumer using software provided according to certain teachings of the present invention, all bi-lateral bids/offers are realized at the same time. Instead of a cascade of transactions, the present invention utilizes a single, multi-party transaction that ensures the multi-layered transaction is appropriately recorded based upon the thread of contingent prices and quantities represented to the consumer at the time of the consumer selection and purchase decision.

Figure 6:
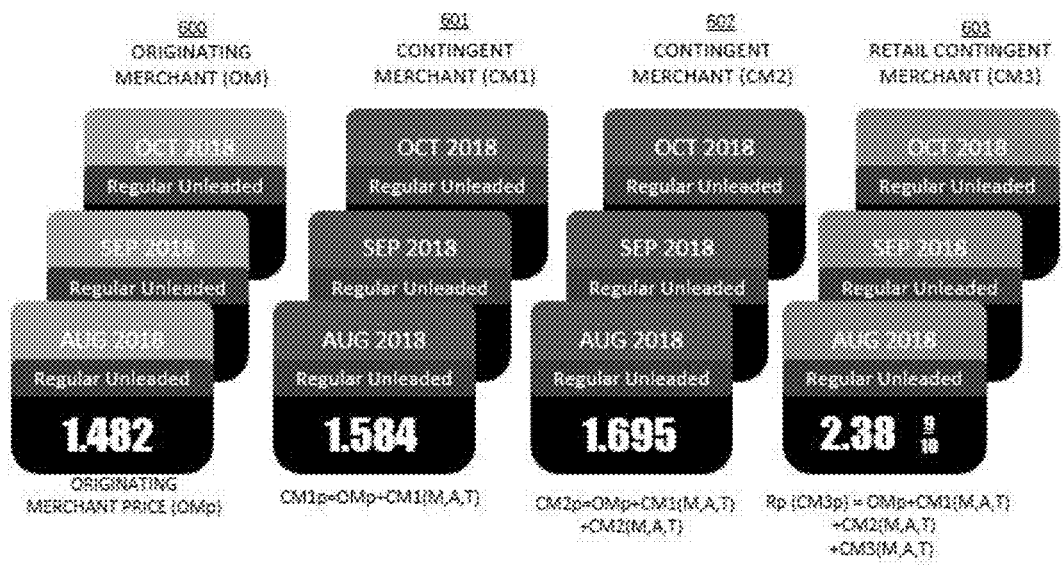
FIG. 6 depicts exemplary forward delivery period contracts and retail price formula of the present invention.

FIG. 6, depicts an exemplary forward delivery period contracts and retail price formula of the present invention, whereby three future delivery contracts (August 2018, SEP 2018, and October 2018), each for regular unleaded gasoline from four (4) inter-related motor fuel merchants (Originating Merchant (OM) 600, Contingent Merchant (CM1) 601, Contingent Merchant (CM2) 602 and Retail Contingent Merchant (CM3) 603. FIG. 6 demonstrates the relative pricing formulas used by the system's contingent price algorithms whereby each contingent motor fuel merchant prices (CM1, CM2 and CM3) are directly computed from the prices posted by the originating merchant (OM) and the margins (M), additional items added by the respective contingent motor fuel merchant (A) and any retail motor fuel taxes (T). As depicted in FIG. 6, each price displayed for contingent merchant (CM1) is equal to the price (p) posted by the originating merchant (OM) plus margins (M), additional items (A) and taxes (T) of CM1. Accordingly, the following price equations are realized:

$$CM1p = OMp + CM1(M,A,T) \quad \text{[Equation 1]}$$

$$CM2p = OMp + CM1(M,A,T) + CM2(M,A,T) \quad \text{[Equation 2]}$$

$$CM3p = OMp + CM1(M,A,T) + CM2(M,A,T) + CM3(M,A,T) \quad \text{[Equation 3]}$$

$$Rp = OMp + \Sigma CMn(M,A,T), \quad \text{[Equation 4]}$$

where n=each contingent merchant and the result follows that any change in OMp or in CMn(M, A, T) results in a change in Rp.

The pricing algorithm of the current embodiment of the present invention is responsible for managing such pricing formulas, cascading of the price changes, and the management of pricing relationship and search update considerations.

Figure 7:
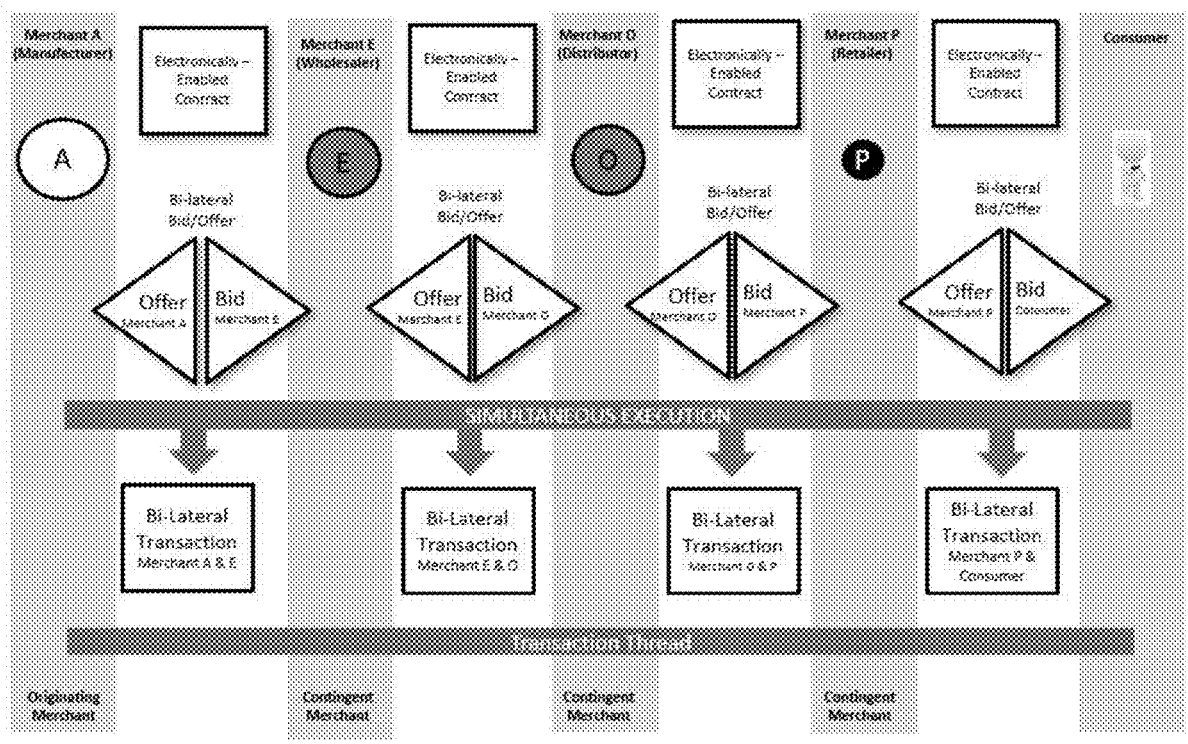
FIG. 7 is a flow chart depicting the simultaneous execution of contingent orders.

For instance, in the exemplary thread depicted in FIG. 7, as a retail motor fuel consumer accepts the offer posted by Merchant P (part of the A-E-O-P thread) as facilitated by the present invention, all merchants within the exemplary thread depicted in FIG. 7 network are executed simultaneously. In the event that while a retail motor fuel consumer is exploring the potential for a retail purchase of a product from Merchant P for a future delivery period, a sudden market disruption occurred and created an immediate change in the price for the same product by the Originating Merchant (Merchant A), the present invention would immediately update all prices in the thread resulting in an immediate change in the consumer price(s) under consideration. In addition, if the consumer, using the present invention software, had initiated the purchase from the retail motor fuel merchant (Merchant P) before the aforementioned sudden price change, the data structure and processing algorithm of the present invention would have already executed and electronically-recorded a simultaneous multi-party reservation to all participating merchants in the respective thread which, by design of the present invention, obligates such merchants to fulfill the pricing and quantity terms in effect prior to the disruption as reflected in data captured in the reservation algorithm. In a preferred aspect of the present invention, all the detailed transaction information of each participant merchant, terms, margins, fees, etc., is stored in the electronically recorded image of the transaction thread. As such, no merchant in the contingent network thread is obligated to purchase or sell any volumes offered prior to a retail motor fuel consumer purchase being initiated.

The above exemplary contingent network and exemplary thread is preferably managed using a multi-layer technology stack. In a preferred aspect of the present invention, prices are published using a creation of a series of merchant specific product exchange instruments whereby each instrument represents a unique motor fuel quality specification for each future delivery period offered by the merchant. The network of the present invention links each instrument to others in the thread and attaches specific order quantities allowed by each merchant for each such instrument. In one preferred embodiment of the present invention, the network management of such instrument details and orders can be accomplished by adapting existing commercially available commodity exchange platforms combined, in combination with a block-chain relationship structure with a unique spread management architecture. As such, the network can "push" prices to merchants and consumers within the network to allow for continuous updates, as well as transaction matching and clearing features to record and manage the complex thread architecture unique to the present invention. In a preferred aspect of the present invention, continuous price changes are visible to the retail motor fuel consumer, allowing the consumer to view, understand, and ultimately participate in the opportunities that such a market place provides to identify and choose if and when such a motor fuel purchase may take place. The adaptation of the present invention to a customized commodity exchange platform allows the information generated from the present invention to be displayed in usual and customary commodity reporting tools.

In a preferred aspect of the present invention, unique merchant interfaces allow merchants to electronically configure their respective delivery and receipt locations (facilities), product specifications and future delivery periods (instruments), prices, quantities and the relationships between their suppliers and their ultimate customers and how any related contingent network relationships (threads) are authorized, transacted, reported, delivered, and paid. The motor fuel merchant interface also interacts with a customized merchant-to-merchant electronically-enabled contract agreement management system to permit the electronic contingent network (thread) relationships to be administered, as well as providing necessary communication with retail motor fuel dispensing pump control operations, payment receipt and coordination with the payment system, and location configuration with Global Positioning Services (GPS) features to assist in motor fuel consumer and retail motor fuel merchant interaction features. In addition, the motor fuel merchant application interface preferably includes a customized messaging system to facilitate contingent network configuration and authorization configuration coordination, related merchant delivery and receipt acknowledgements, and related merchant payment and receipt coordination features.

III. Retail Motor Fuel Consumer Transaction

A retail motor fuel consumer, whether an individual, business, or municipality, faces motor fuel price volatility because their current respective purchasing choices are limited to the antiquated signage (most commonly gas station signage) reflecting the current spot market price for immediate pickup of available motor fuels at the then current time and location of each respective retail motor fuel merchant. The inelastic nature of motor fuel means that regardless of the price consumers must pay to purchase their motor fuel when they need it and therefore budgeting their motor fuel consumption is difficult and costly. Consumers typically do not have the ability to store significant amounts of motor fuel safely for future use and therefore are generally unable to safely warehouse motor fuels when prices are low.

In a preferred embodiment of the present invention, an application, preferably an internet-connected mobile device application or internet-connected browser-based web application, is provided to allow consumers the ability to access offers from retail motor fuel merchants and to purchase various types motor fuel for different future delivery periods from retail merchants, such as retail gas stations, participating on the platform. In one embodiment of the present invention, the program displays to the retail motor fuel consumer the retail motor fuel prices for the different motor fuel types electronically published within the price servers for each of the future delivery periods offered. The program provides a listing of each participating retail motor fuel merchants and a tool for comparing prices offered for each type of motor fuel and each future delivery period configured. This allows customers the ability for the retail motor fuel consumer to compare prices (price transparency) for different delivery periods (price discovery) for different motor fuel types (expanded consumer options), providing retail motor fuel consumer users of the present invention with options for selecting, and ultimately exercising enhanced control of, their current and future motor fuel needs. In this manner, even without the ability to safely inventory quantities of motor fuel, if prices offered by retail motor fuel merchants for a delivery period in the future were to become favorable to the retail motor fuel consumer, the present invention would provide such consumers with the ability to immediately purchase quantities of such favorably priced motor fuels to be picked up during subsequent specified time periods. Retail motor fuel consumers are thus able to take advantage of potentially lower prices and/or budget their motor fuel expenditures far beyond their ability to safely inventory (store) such quantities at current spot prices.

Figure 8A:
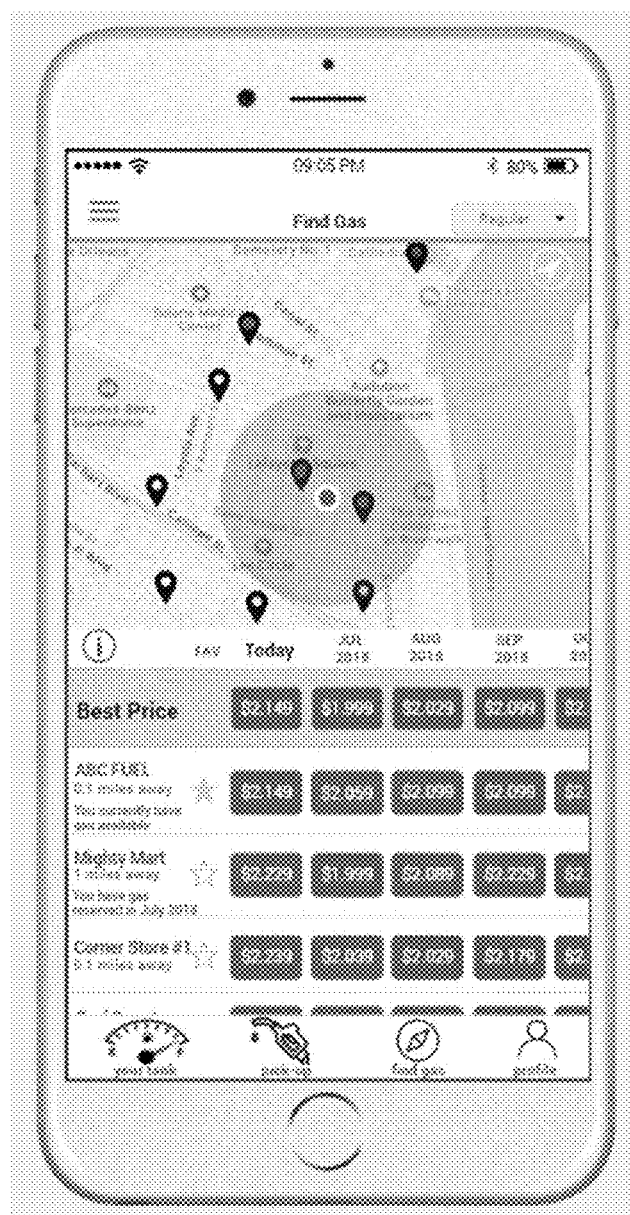
FIGS. 8a-d depict screenshots for an exemplary smartphone-enabled application, in accordance with certain teachings of the present invention.

FIGS. 8a-d provides details for one illustrative embodiment of an internet-connected mobile device application (smartphone) in accordance with certain teachings of the present invention. FIG. 8a is an exemplary screenshot displaying retail regular unleaded gasoline offers available to retail motor fuel consumers from several retail motor fuel merchants (gas station merchants) for regular unleaded gasoline with different prices for each retail motor fuel merchant and for each delivery period within the vicinity of the consumer, including a GPS locator for each retail motor fuel merchant. In this illustrative screenshot, the retail motor fuel consumer is provided options for selecting and purchasing gasoline today, or in defined periods in the future (e.g., April 2018, May 2018, June 2018, etc.) for future pick up. In this illustrative embodiment, the consumer is also able to view the "best price" option from the posted offers for each time period.

In the current embodiment, the motor fuel prices for each retail motor fuel merchant and for each motor fuel type and each future delivery period is displayed to retail motor fuel consumers, whereby each retail motor fuel price is electronically linked to a specific product, price, and future delivery date of an originating merchant. The number of motor fuel merchants linked by the present invention between the originating merchant and the retail motor fuel merchant (thread) may vary between zero (the retail motor fuel merchant is the originating merchant) to as many as fifteen (15) or more contingent merchants to accommodate potentially complex logistical configurations and relationships between motor fuel merchants. Each contingent merchant in each respective thread will physically participate in the delivery of the motor fuel for sale during each respective period of time in the future to the respective retail merchant, and accordingly, include their fees, profit margins, and transportation costs into the formation of the price offer that is ultimately offered and displayed to the consumer. Any changes in any merchant's respective price, fees, profit margins, transportation costs, etc., are immediately updated to all related merchants within the related threads by the present invention through the pricing algorithms facilitated through the platform network and updated on the consumer's application. In this way, it is envisioned that numerous changes may be displayed as a user is reviewing the options available to purchase.

As numerous changes may be occurring while the retail motor fuel consumer is searching for motor fuel options available on the application, when a retail motor fuel consumer selects an offer (retail station, motor fuel type, quantity, delivery period and price for purchase), the retail motor fuel consumer will be preferably provided with a confirmation screen that will effectively freeze any price changes while the consumer is given a limited time (e.g., 30 seconds) to confirm that the displayed selection is correct prior to final transaction execution. In order to facilitate such a confirmation process in a high-frequency multi-layered thread relationship, the network of the present invention executes a multi-layered simultaneous transaction on the respective thread during the confirmation period. If the transaction is ultimately not confirmed, then the transaction is reversed by the invention software.

The current embodiment of the present invention would then securely utilize the consumer's pre-defined credit or debit account information to purchase the desired motor fuel type and quantity from the selected retail motor fuel merchant for the delivery period selected. In this manner, this retail motor fuel consumer purchase action generates an electronically-enabled contractual obligation for each participating merchant in the multi-layered thread relationship transaction to deliver the specified quantity to each respective merchant in the transacted thread relationship with a joint and several overall obligations to deliver such motor fuel product and quantity to the retail motor fuel consumer at the transacted price during the specified delivery period.

Figure 8B:
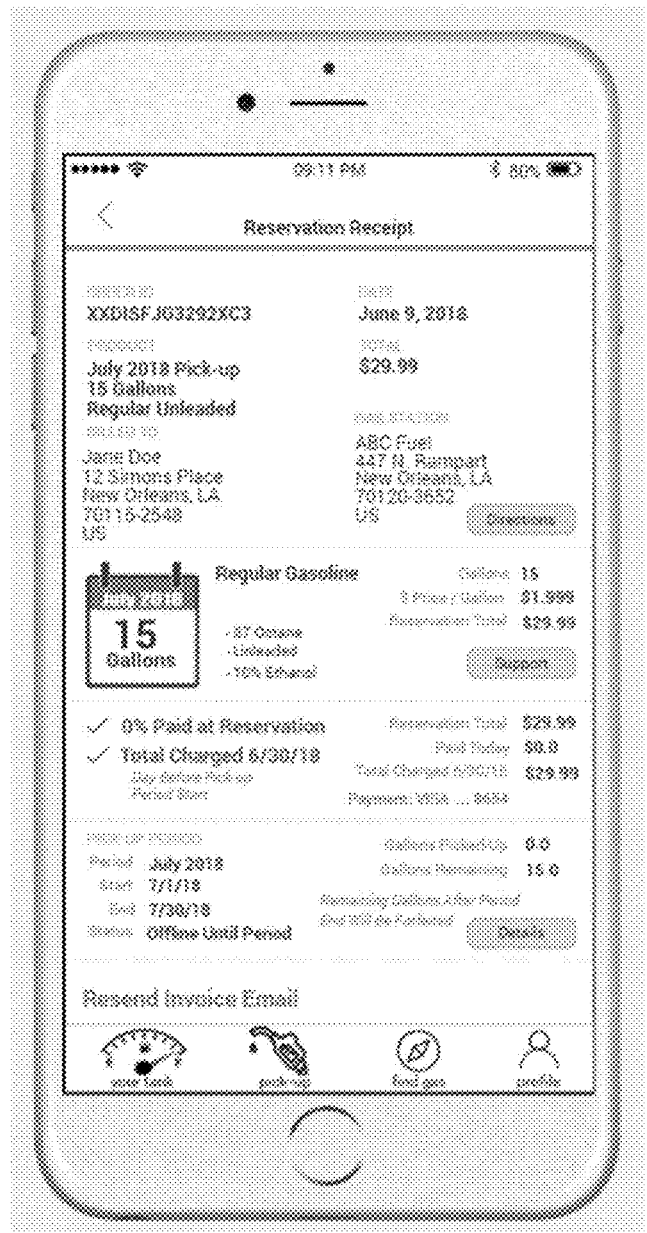

FIG. 8b is an exemplary screenshot displaying a purchase and reservation receipt of a motor fuel purchase made by a retail motor fuel consumer from a retail motor fuel merchant. Included information includes, without limitation, the date of purchase, billing information, grade of fuel purchased, retail motor fuel merchant (gas station) location, future delivery (pick up) period (June 2018), quantity (gallons) purchased, and the quantity of motor fuel, if any, that has already been picked up by the retail motor fuel consumer for the respective delivery period.

Figure 8C:

FIG. 8c is an exemplary screenshot displaying purchases/reservations made by the consumer, including an overall summary and a listing of purchases/reservations for the current month, recently made purchases/reservations, and purchases/reservation scheduled for future delivery dates. Each of these purchases/reservations may be individually selected to return to a purchase/reservation summary screen, such as, for example, the exemplary screenshot illustrated in FIG. 8b.

Figure 8D:
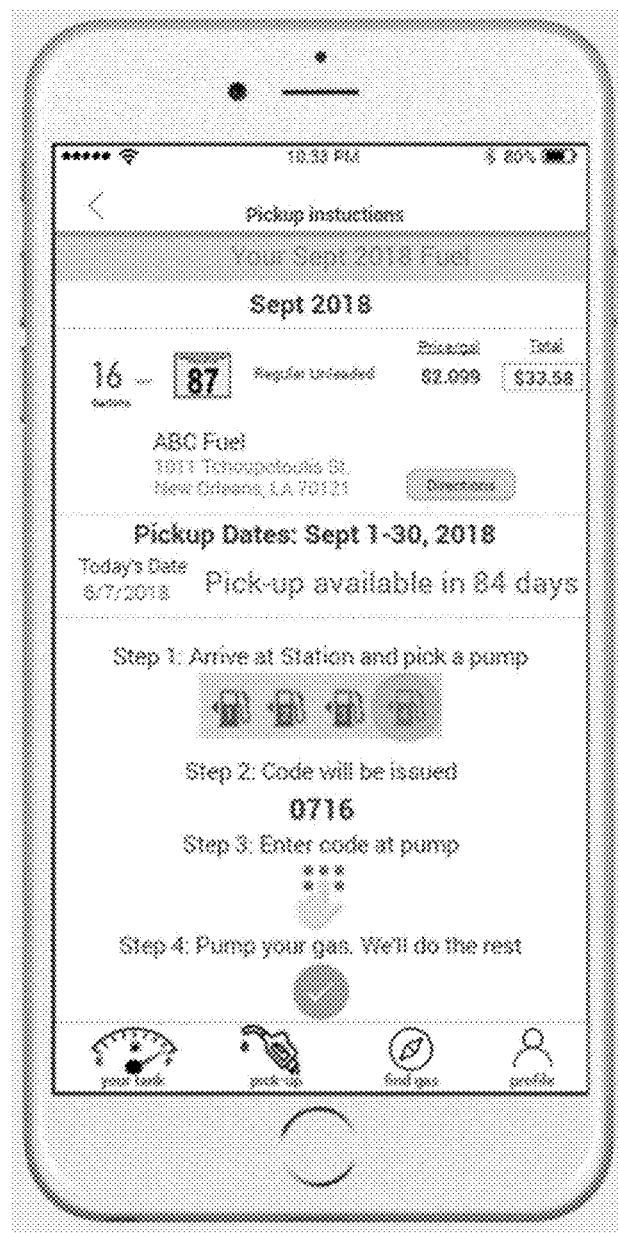

FIG. 8d is an exemplary screenshot used by the retail motor fuel consumer to pick up their purchased/reserved motor fuel. The retail motor fuel consumer is provided with information concerning the retail motor fuel merchant (including directions, if needed), quantity (gallons) remaining to be picked up from the respective retail motor fuel merchant for the respective delivery period, grade of motor fuel purchased, days left in the delivery period for completing the retail motor fuel consumer's respective pick up of the quantities purchased/reserved, and step-by-step instructions for completing the respective pickup. In this illustrative embodiment, the present invention software application provides the customer with an authorization code to be entered at the retail motor fuel merchant's fuel dispensing pump in order to authenticate that the retail motor fuel consumer is physically located in front of the pump before the dispensing pump is authorized to begin dispensing any motor fuel to the respective retail motor fuel consumer, although one of ordinary skill in the art will appreciate that other secure means for enabling the dispensing pump can be utilized in conjunction with the present invention, including but not limited to wireless communication with the dispensing pump, dispensing pump controller software, integration of scanning quick-response (QR) codes affixed to the dispensing pumps to initiate dispensing pump control communication via the software application of the present invention, as well as, the simultaneous integration with existing retail motor fuel loyalty and convenience systems that deploy the use of a scan device, thumb print reader, or other convenience identification mechanism. The dispensing pump is then enabled to dispense a portion, or all of the quantity of retail motor fuel previously purchased/reserved by the retail motor fuel consumer using the software application of the present invention, and accordingly, no additional exchange of money is required by the retail motor fuel consumer in order to complete the pickup of the motor fuel. Furthermore, it is a preferred aspect of the present invention that participating merchants in the transaction thread will only receive payment upon delivery of the respective product to each respective connected merchant in the aforementioned contingent multi-layered thread to ensure delivery performance.

In yet another embodiment of the present invention, participating merchants may offer retail motor fuel consumers with different features that may attract retail motor fuel consumers to their retail motor fuel physical location or to the franchised network brand of motor fuel merchant locations, such as the ability to offer a single, significantly lower incentive price from all participating franchised retail motor fuel merchants of a certain brand for a limited time and for a limited quantity that could be picked up from any of the respective brand of motor fuel merchant locations during the future period offered in the promotional opportunity. Such an advertising program is commonly found, for example, in the airline reservation industry, automobile reservation industry and cellular communications industry but have not yet been had a mechanism to make such an offer capable of deployment to the motor fuel industry prior to the present invention.

Another embodiment of the present invention is to allow the flexibility for a retail motor fuel merchant (or group of retail motor fuel merchants) to provide retail motor fuel consumers with the option for the rollover of unused motor fuel purchases (quantities of motor fuel purchased for pickup during a specific delivery period that were not picked up by the retail consumer during the specified delivery period) to be made available for a later period, subject to potential change fees or other adjustments, if any, by the design of the retail motor fuel merchant's promotional discretion, as defined from time to time. Such options are commonly found in the airline industry with airlines differentiating their ticket offerings by providing consumers with different options in the event that he or she desires to change their ticket reservations, with some airlines charging significant change fees and restrictions to flight reservation changes. On the other hand, other airlines offer customers with the ability to change reservations without change fees, but charges customers the difference in airfare based upon current ticket prices. The present invention will allow retail motor fuel merchants to vary such features as desired, from time to time, to provide retail motor fuel customers with options for picking up unused portions of purchased (reserved) motor fuel.

An additional embodiment of the present invention allows originating merchants the ability to create a pricing paradigm shift in the long-dated planning cycle of most motor fuel providers. In this manner, originating merchants can, for example, offer long-dated motor fuel price incentives to defray planning and economic risks of the originating merchant while offering the ultimate retail motor fuel consumer the opportunity to participate in such price incentives. This paradigm shift involves the construct of a long-dated price discount incentive vs. a near-term convenience premium alternative. Such a pricing model is commonly found in the airline industry, with airlines offering long-dated price incentives vs. full fare rates immediately prior to departure. The present invention thus enables motor fuel originating merchants the ability to adjust the motor fuel pricing paradigm to incentivize retail consumers to be attracted to purchasing (reserving) long-dated quantities to achieve potentially attractive price discounts.

In yet another embodiment of the present invention, retail motor fuel merchants can allow retail motor fuel consumers the option to name their price for a certain grade of motor fuel from a certain retail motor fuel merchant (or group of franchised retail motor fuel merchants) for a specific future period of time. Each retail motor fuel consumer would be provided with the opportunity to specify a price of a certain grade motor fuel for a certain delivery period in the future that, if available, such a retail motor fuel consumer would agree to purchase such a specified quantity. Providing the ability for a retail motor fuel consumer to enter a "bid" in the software application of the present invention allows the consumer to stipulate a firm interest to buy a certain motor fuel type at a specified price and quantity for a period of time. Such information is currently not available to the motor fuel merchants and may provide motor fuel merchants within the respective network thread with incentives to fill such requests in order to stimulate sales of quantities in future delivery periods. In terms of potential market implications, the market intelligence created by such a feature could ultimately create downward price pressures by creating significant buy-side liquidity, transparency and information at certain price levels for different future periods of delivery, which is very common attribute found in professional commodity exchange marketplaces, but currently not available, until now, to the retail motor fuel consumers and retail motor fuel merchants.

An additional embodiment of the present invention is to enable motor fuel merchants to create new promotional incentives and loyalty discounts from a certain motor fuel merchant (or group of franchised merchants) for a certain period. Retail motor fuel merchant loyalty programs have historically focused on providing incentives to have retail motor fuel customers return to the retail motor fuel location (or franchise of merchants) for their next motor fuel purchase based upon the then current spot market prices. The present invention enables retail motor fuel merchants to offer spot market purchase incentives, as well as extensive incentives to make future delivery period motor purchases using the software application of the present invention. A key aspect of a future delivery period motor fuel purchase incentive is that the retail motor fuel merchant knows that such retail motor fuel customers will be returning to their retail motor fuel merchant location during the specified future delivery period. Such knowledge allows the retail motor fuel merchant to provide the retail motor fuel customer with additional incentives, rewards points, or other continued marketing and promotional options for additional items upon their return.

An additional embodiment of the present invention is to facilitate municipalities and business of all sizes with the capacity to manage future motor fuel requirements through the invention platform, allowing its employees to obtain motor fuels at prices and locations selected by the respective management levels to strategically secure prices at levels that meet their respective budgeting, planning and/or risk management needs. The current marketplace has many versions of corporate and/or municipality motor fuel purchase control systems related to the deployment of commercial vehicles or a fleet of cars, but the vast majority of such current methods involve credit card purchase restrictions (i.e., credit cards with limited purchase limits or purchase types, commonly referred to as "P-cards"), with most still purchasing motor fuels at spot market rates. Other current methods involve the purchase of a tanker truck of motor fuel (i.e., 7,000-gallon purchases) at spot market that may provide some volume discount but require the physical inventory and storage ability of the business and the risks, equipment and issues related to such a solution. The majority of small business and municipalities have a limited or no ability to lock in future prices and quantities in a distributed location deployment in the future at customized volumes. The present invention enables such capabilities and allows such participating businesses to manage price exposure and reduce price volatility risks.

Yet another embodiment of the present invention is to facilitate alternative fuels, such as electricity power for hybrid/electric cars. The architecture of the present intention allows merchants of any form of motor fuel, including electric utilities, to offer contingent multi-layered thread relationships, as needed, to participating dispensing merchants that offer distributed retail electric charging solutions to facilitate the ability for retail consumers of such future electric charging needs to acquire future power needs for specific periods at certain prices offered by such merchants. The deployment of electricity as a motor fuel electronically through the present invention involves fewer contingent merchants (power is already distributed to most locations) and different consumer discharge (i.e., pump) interfaces, with all other components effectively the same. As such, the present invention is intended to be applicable to any motor fuel in a manner that one of ordinary skill in the art would appreciate is similar to that which is described in detail herein with respect to gasoline.

Additional Embodiments

In one embodiment of the present invention, a system for selling motor fuel is disclosed, the system comprising a computerized network configured to facilitate motor fuel transactions amongst participating motor fuel merchants wherein the network is further configured to provide one or more offers to sell a motor fuel for pick up by a consumer at a specified pick up location during a specified period of time. The system also comprises an application for use by the consumer, wherein the application is configured: (a) to present the offers to the consumer, (b) to enable the consumer to select at least one of the offers, (c) to enable the consumer to purchase a quantity of the motor fuel from the selected offer, and (d) to validate the pickup of any portion of the purchased quantity of the motor fuel at the specified location during the specified period of time for the selected offer. It is envisioned that the motor fuel of the present invention may be selected from gasoline, diesel, methane, ethane, compressed natural gas, liquefied natural gas, hydrogen, electricity, jet fuel, propane, butane, liquefied petroleum gas, biofuels, or any other motor fuel that one or ordinary skill in the art would appreciate would benefit from the system of the present invention.

The participating motor fuel merchants comprise one or more retail merchants selected from gasoline fueling stations, diesel fueling stations, electric car charging stations, hydrogen fueling stations, compressed natural gas fueling stations, or liquefied natural gas fueling stations. Furthermore, the participating motor fuel merchants comprise a plurality of retail merchants and a plurality of contingent supplier merchants, and wherein each of the offers is made by a retail merchant and is contingent upon the pricing and quantities offered by one or more of the contingent supplier merchants. The plurality of contingent supplier merchants comprise manufacturing merchants selected from refineries, natural gas processing plants, or electric utility companies, and transportation merchants selected from fuel terminals, pipelines, utility system operators, local distribution companies, or trucking companies. In the present embodiment, the motor fuel transactions comprise sales contracts, and the network simultaneously executes all sales contracts between the retail merchant and the one or more contingent supplier merchants when the consumer purchases the quantity of motor fuel from one of the offers. The specified location for each offer may comprise a specific retail merchant location, or may comprise a plurality of retail merchant locations.

According to the present embodiment, the consumer application may comprise a web-based application or a smartphone application, and the consumer may access the application on a smartphone or other mobile device, or at a self-service terminal. The consumer application is further configured to lock the offer selected by the consumer for a period of time to allow the consumer to complete the purchase. The consumer application further enables the consumer to select a plurality of the offers. The system further comprises a merchant application for enabling each of the participating motor fuel merchants to interface with the computerized network. In this aspect of the present invention, the network updates the offers to consumers based on input from any of the participating motor fuel merchants. This input is selected from transportation costs, purchases of motor fuels at a specific cost, third-party source price costs, product additive or blending costs, credit card convenience costs, fees, taxes, profit margin, or combinations thereof.

Another embodiment of the present invention is a method for purchasing a quantity of motor fuel for future pick up. The method comprises (a) receiving from a computerized network one or more offers to purchase a motor fuel for future pickup, wherein each offer comprises a price per quantity of the motor fuel, a specified pickup location, and a specified period of time for pickup; (b) selecting one of the offers; (c) selecting a quantity of the motor fuel to purchase for the selected offer; and (d) purchasing the selected quantity of motor fuel for the selected offer. Any portion of the purchased quantity of motor fuel may be picked up at the specified pick up location during the specified period of time for pickup. The specified location for each offer may comprise a specific retail merchant location, or may comprise a plurality of retail merchant locations. This method further comprises selecting a plurality of the offers, selecting a quantity of the motor fuel to purchase for each of the selected offers, and purchasing the selected quantities of motor fuel for each of the selected offers.

According to certain teachings of the present invention, the steps of this method are performed by the purchaser using an application, which can be, for example, a web-based application or a smartphone application. The purchaser accesses the application on a smartphone or other mobile device, or on a self-service terminal. The application further enables the purchaser to validate the pickup of any portion of the purchased quantity of motor fuel at the specified pickup location during the specified period of time for pickup. This validation may occur by the application providing a validation code to be entered at the specified pick up location, or by the application reading a device QR code at the specified pick up location, or by a device at the specified pick up location reading a digital authentication code generated by the application, or by any other means known in the art.

Yet another embodiment of the present invention is a method for selling a quantity of motor fuel for future pick up by a consumer. The method comprises (a) providing a consumer with one or more offers to purchase a motor fuel for future pick up, wherein each offer comprises a price per quantity of the motor fuel, a specified pick up location, and a specified period of time for pick up; and (b) selling to the consumer a quantity of the motor fuel for a selected offer. Any portion of the purchased quantity of motor fuel may be picked up at the specified pick up location during the specified period of time for pick up. The specified pick up location for each offer may comprise a specific retail merchant location, or may comprise a plurality of retail merchant locations. This method further comprises selling to the consumer a quantity of motor fuel for each of a plurality of selected offers.

According to certain teachings of this embodiment, the steps of the method are performed by the seller using a computerized network. The consumer receives the provided offers, selects one of the offers, selects a quantity of motor fuel for the selected offer, and purchases the quantity of motor fuel for the selected offer using an application, which can be, for example, a web-based application or a smartphone application. The consumer accesses the application on a smartphone or other mobile device, or on a self-service terminal. The application further enables the purchaser to validate the pickup of any portion of the purchased quantity of motor fuel at the specified pickup location during the specified period of time for pickup. This validation may occur by the application providing a validation code to be entered at the specified pick up location, or by the application reading a device QR code at the specified pick up location, or by a device at the specified pick up location reading a digital authentication code generated by the application, or by any other means known in the art.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings therein. It is therefore evident that the particular embodiments disclosed above may be altered or modified and all such variations are considered within the scope and sprit of the present invention.

What is claimed is:

1. A system for selling motor fuel, comprising:
   a computerized network configured to facilitate motor fuel transactions amongst participating motor fuel merchants comprising a plurality of retail merchants and a plurality of contingent supplier merchants, wherein the network is further configured to provide one or more offers to sell a motor fuel at a specified future price for pick up by a consumer at a specified pick up location during a specified period of time, wherein each of the offers is made by a retail merchant and is contingent upon the pricing and quantities offered by recorded interconnected network of offers; and an application for use by the consumer, wherein the application is configured: (a) to present the offers to the consumer, (b) to enable the consumer to select at least one of the offers, (c) to enable the consumer to purchase a quantity of the motor fuel from the selected offer, (d) in response to purchase of one of the offers by the consumers, triggers a simultaneous execution of all purchases and sales in the interconnected network of offers, and (e) to validate the pickup of any portion of the purchased quantity of the motor fuel at the specified location during the specified period of time for the selected offer;

wherein the motor fuel transactions comprises sales contracts, and wherein the network simultaneously executes all sales contracts between the retail merchant and the one or more contingent supplier merchants in the interconnected network of offers when the consumer purchases the quantity of motor fuel from the retail merchant offer.

2. The system of claim 1, wherein the participating motor fuel merchants comprise one or more retail merchants selected from gasoline fueling stations, diesel fueling stations, electric car charging stations, hydrogen fueling stations, compressed natural gas fueling stations, or liquefied natural gas fueling stations.

3. The system of claim 1, wherein the plurality of contingent supplier merchants comprise manufacturing merchants selected from refineries, natural gas processing plants, or electric utility companies.

4. The system of claim 1, wherein the plurality of contingent supplier merchants comprise transportation merchants selected from fuel terminals, pipelines, utility system operators, local distribution companies, or trucking companies.

5. The system of claim 1, wherein the specified location for each offer comprises a specific retail merchant location.

6. The system of claim 1, wherein the specified location for each offer comprises a plurality of retail merchant locations.

7. The system of claim 1, wherein the application comprises a web-based application.

8. The system of claim 1, wherein the application comprises a smartphone application.

9. The system of claim 1, wherein the consumer accesses the application on a smartphone or other mobile device.

10. The system of claim 1, wherein the consumer accesses the application on a self-service terminal.

11. The system of claim 1, wherein the application is configured to lock the offer selected by the consumer for a period of time to allow the consumer to complete the purchase.

12. The system of claim 1, wherein the motor fuel is selected from gasoline or diesel.

13. The system of claim 1, wherein the motor fuel is selected from methane, ethane, compressed natural gas, or liquefied natural gas.

14. The system of claim 1, wherein the motor fuel comprises hydrogen.

15. The system of claim 1, wherein the motor fuel comprises electricity.

16. The system of claim 1, wherein the motor fuel comprises jet fuel.

17. The system of claim 1, wherein the motor fuel is selected from propane, butane, or liquefied petroleum gas.

18. The system of claim 1, wherein the motor fuel comprises biofuels.

19. The system of claim 1, further comprising a merchant application for enabling each of the participating motor fuel merchants to interface with the computerized network.

20. The system of claim 1, wherein the network updates the offers based on input from any of the participating motor fuel merchants.

21. The system of claim 20, wherein the input is selected from transportation costs, purchases of motor fuels at a specific cost, third-party source price costs, product additive or blending costs, credit card convenience costs, fees, taxes, profit margin, or combinations thereof.

22. The system of claim 1, wherein the application enables the consumer to select a plurality of the offers.

23. A system for selling motor fuel, comprising:

a computerized network configured to facilitate motor fuel transactions amongst participating motor fuel merchants comprising a plurality of consumer-facing merchants and a plurality of contingent supplier merchants, wherein the network is further configured to provide one or more offers to sell a motor fuel at a specified future price for pick up by or delivery to a consumer at a specified pick up location during a specified period of time, wherein each of the offers is made by a consumer-facing merchant and is contingent upon the pricing and quantities offered by one or more of the contingent supplier merchants in a multi-layered, electronically recorded, interconnected network of offers; and an application for use by the consumer, wherein the application is configured: (a) to present the offers to the consumer, (b) to enable the consumer to select at least one of the offers, (c) to enable the consumer to purchase a quantity of the motor fuel from the selected offer, (d) in response to purchase of one of the offers by the consumer, triggers a simultaneous execution of all purchases and sales in the interconnected network of offers, and (e) to validate the pickup or delivery of any portion of the purchased quantity of the motor fuel at the specified location during the specified period of time for the selected offer;

wherein the motor fuel transactions comprises sales contracts, and wherein the network simultaneously executes all sales contracts between the consumer-facing merchant and the one or more contingent supplier merchants in the interconnected network of offers when the consumer purchases the quantity of motor fuel from the consumer-facing merchant offer.

24. The system of claim 23, wherein the consumer-facing merchant is selected from gasoline fueling stations, diesel fueling stations, electric car charging stations, hydrogen fueling stations, compressed natural gas fueling stations, or liquefied natural gas fueling stations.

25. The system of claim 23, wherein the consumer-facing merchant is a motor fuel merchant selected from refineries, fuel distributors, fuel terminals, pipelines, utility system operators, local distribution companies, or trucking companies.

* * * * *